US006940951B2

(12) United States Patent
Mahoney

(10) Patent No.: US 6,940,951 B2
(45) Date of Patent: Sep. 6, 2005

(54) TELEPHONE APPLICATION PROGRAMMING INTERFACE-BASED, SPEECH ENABLED AUTOMATIC TELEPHONE DIALER USING NAMES

(75) Inventor: Jerome R. Mahoney, Colts Neck, NJ (US)

(73) Assignee: iVoice, Inc., Matawan, NJ (US)

( * ) Notice: Subject to any disclaimer, the term of this patent is extended or adjusted under 35 U.S.C. 154(b) by 252 days.

(21) Appl. No.: 10/055,854

(22) Filed: Jan. 23, 2002

(65) Prior Publication Data

US 2002/0097845 A1 Jul. 25, 2002

Related U.S. Application Data

(63) Continuation-in-part of application No. 09/767,448, filed on Jan. 23, 2001, now Pat. No. 6,563,911.

(51) Int. Cl.$^7$ ............................................... H04B 1/40
(52) U.S. Cl. ........................ 379/88.03; 379/88.01; 379/88.04; 455/460; 455/563; 455/564
(58) Field of Search .......................... 379/88.03, 88.01, 379/88.04, 88.02, 88.06, 88.05, 88.07, 67.1, 133, 229, 142.01, 201.01, 354, 88.18, 88.16, 88.22, 207.02, 201.02, 212.01, 207.45, 221.09, 221.11, 428.04, 352, 355.01–355.09, 355.188, 355, 428, 114, 67, 88, 142, 201, 385, 357, 428.02, 447; 455/563, 460, 564, 412.1, 567, 569.1, 569.2, 575.9, 422.1, 415, 418, 419, 79, 561, 554.1, 554.2–557, 575.1, 559.1, 413, 596, 566, 575, 151.1; 704/236, 255, 239, 243, 247, 266, 270, 246, 231, 258; 381/163, 182, 370, 375, 329

(56) References Cited

U.S. PATENT DOCUMENTS

| 5,111,501 A | 5/1992 | Shimanuki .................... 379/355 |
| 5,136,634 A | 8/1992 | Rae et al. .................... 379/100 |

(Continued)

OTHER PUBLICATIONS

BrightArrow PhoneAssistant and SpeechDialer disclosures, dated May 20, 1999 and Aug. 15, 2000. ASRNEWS advertisement for SpeechDialer, dated May 1999.

(Continued)

*Primary Examiner*—Edward F. Urban
*Assistant Examiner*—Charles Chow
(74) *Attorney, Agent, or Firm*—Kenneth P. Glynn

(57) ABSTRACT

A speech enabled automatic name dialer dialing system for connection to a telephone system, includes a user computer with a computer-based address book program for retrieval of name-telephone number data for creation of speech enabling phoneme sets for auto dialing by speaking a name, and utilizing telephone application programming interface (TAPI), for use with a telephone systems having telephones with private branch exchanges. There is at least one user computer having a microphone and a speaker; a telephone application programming interface provider installed in the user computer; and at least one loaded address book program or equivalent name-telephone number data base contained in the user computer. The software for the user computer, which accesses the data base, creates the phonemes from names of data sets, receives voice inputs, matches the voice input phonemes to the data and signals to a router and PBX to initiate dialing.

16 Claims, 3 Drawing Sheets

U.S. PATENT DOCUMENTS

| | | | | |
|---|---|---|---|---|
| 5,165,095 A | | 11/1992 | Borcherding | 379/88 |
| 5,168,548 A | | 12/1992 | Kaufman et al. | 395/2 |
| 5,222,121 A | | 6/1993 | Shimada | 379/88 |
| 5,231,670 A | | 7/1993 | Goldhor et al. | 381/43 |
| 5,239,586 A | | 8/1993 | Marul | 381/47 |
| 5,301,227 A | | 4/1994 | Kamei et al. | 379/88 |
| 5,335,276 A | | 8/1994 | Thompson et al. | 380/21 |
| 5,349,636 A | | 9/1994 | Irribarren | 379/89 |
| 5,406,618 A | | 4/1995 | Knuth et al. | 379/67 |
| 5,452,340 A | * | 9/1995 | Engelbeck et al. | 379/67 |
| 5,602,963 A | | 2/1997 | Bissonnette et al. | 395/2.84 |
| 5,621,658 A | | 4/1997 | Jackson et al. | 364/514 |
| 5,631,745 A | | 5/1997 | Wong et al. | 358/434 |
| 5,671,328 A | | 9/1997 | Fitzpatrick et al. | 395/2.55 |
| 5,799,072 A | * | 8/1998 | Vulcan et al. | 379/114 |
| 5,850,627 A | | 12/1998 | Gould et al. | 704/231 |
| 5,905,774 A | * | 5/1999 | Tatchell et al. | 379/88.04 |
| 5,912,949 A | * | 6/1999 | Chan et al. | 379/88.03 |
| 5,917,891 A | * | 6/1999 | Will | 379/88.03 |
| 5,991,364 A | * | 11/1999 | McAllister et al. | 379/88.01 |
| 6,198,947 B1 | * | 3/2001 | Barber | |
| 6,459,911 B1 | * | 10/2002 | Hijii | 455/563 |

OTHER PUBLICATIONS

Nortel Networks advertisement, dated Dec. 1, 1998. Letter, dated Dec. 15, 1998 regarding Nortel Network's OpenSpeech products.

Registry Magic publications, dated Feb. 1998 and Fall 1998 on Virtual Dialer.

Phonetic systems, Inc. disclosure secribing speech–enabled "name dialing" using personal directories.

VirtualVoice Assistant disclosure which describes an interface with Microsoft Outlook.

Microsoft publication, dated Oct. 1998 disclosing Call Manager Software, "New YorkTimes" article dated Dec. 17, 1998 describing Wildfire voice dialing.

* cited by examiner

TELEPHONE APPLICATION PROGRAMMING INTERFACE-BASED, SPEECH ENABLED AUTOMATIC TELEPHONE DIALER USING NAMES

REFERENCE TO RELATED APPLICATIONS

This application is a Continuation-In-Part of U.S. patent application Ser. No. 09/767,448, entitled "Speech Enabled, Automatic Telephone Dialer Using Names, Including Seamless Interface With Computer-Based Address Book Programs," filed on Jan. 23, 2001 now U.S. Pat. No. 6,563,911, by the same inventor named herein.

BACKGROUND OF THE INVENTION

1. Field of the Invention

The present invention relates to voice speech enabled (voice responsive) systems, devices and methods for making telephone calls automatically, i.e., without dialing, by speech enabled automatic dialing by use of computer-based address book programs or equivalent name-telephone database, which are prompted by speaking the name of an entry already contained within the computer-based address book program or a equivalent name-telephone database, and with the use of a Telephone Application Programming Interface (TAPI) provider included within the user computer. The present invention devices include all systems using a PBX (private branch exchange), including telephones and computer workstations which rely upon separate host server central processors and those which are self-contained, i.e. contain all necessary software within the user computer.

2. Information Disclosure Statement

The following prior art patents represent various inventions relating to machine involving speech recognition for voice-based operation and thus illustrate known voice recognition applications:

U.S. Pat. No. 5,111,501 to Masanobu Shimanuki describes a telephone terminal device equipped with a transmitter microphone, a receiver, a speech recognition unit that receives and recognizes speech signals from the transmitter microphone and a circuit to reduce the level of signals send from a telephone network to the receiver when the speech recognition unit receives speech signals from the transmitter microphone. Further, this device is preferably equipped with a speech reproduction unit that reproduces the speech information stored in memory, in response to the information of recognition result from the speech recognition unit, and a circuit that prevents transmission of signals from the telephone network to the receiver when the regenerated speech information is sent to the receiver. Furthermore, it is desirable for this device to be provided with a circuit that prevents generation of ringing tones when an incoming call arrives.

U.S. Pat. No. 5,136,634 to David C. Rae et al. describes voice operated facsimile machine network which includes a method and apparatus for transmitting specifically requested graphic and/or textual data from an unattended database storage location to a requestor's facsimile machine over a telephone line which includes a host computer such as a PC modified with a facsimile transmission board and a voice generation board. The host computer receives incoming phone calls and prompts the caller using the voice board to select data files by using the DTMF keys of a standard telephone handset. The PC can be left unattended and can run automatically in the facsimile transmission mode. Callers can immediately access needed textual and image data with the use of just a standard telephone and facsimile machine. Multiple workstation nodes can be configured in a network setup to handle a high volume of calls in real time and to allow multiple data services to operate simultaneously.

U.S. Pat. No. 5,165,095 to Mark A. Borcherding describes a method for dialing a telephone, using voice recognition to initiate the dialing and to determine the correct telephone number. The dialing is initiated with a spoken dial command that is recognized by using speaker independent templates that are stored locally with respect to the caller's telephone. The correct telephone number is recognized by using speaker dependent template that are downloaded from a central database or by using speaker independent templates stored locally.

U.S. Pat. No. 5,168,548 to Steven Kaufman et al. describes a reporting system which is disclosed herein, a speech recognizer which is used to select selections of text from a report form stored in a computer and to insert recognized terms in the text thereby to generate a report text under voice control. A command interpreter, also responsive to spoken words, initiates creation of the report text and its subsequent storing, printing and transmission. The command processor is responsive to respective spoken commands to select a destination telephone number and to cause the report text to be sent to apparatus for converting report text to image data and for modulating an audio band signal with the image data for facsimile transmission over telephone lines.

U.S. Pat. No. 5,222,121 to Keiko Shimada describes a voice recognition dialing unit of a telephone mounted on a vehicle or similar mobile body and which allows a call to be originated with ease. When the user of the telephone enters a voice command on voice inputting section, the dialing unit originates a call automatically and thereby connects the other party to the telephone line. In a call origination procedure, the operations for call origination and the verifications are performed between the user and the unit in an interactive sequence. In a preferred embodiment, the unit has a particular call origination procedure in which, when the other party recognized by the unit is wrong as determined by the user by verification, lower place candidates for the other party are called up in response to a particular voice command. In an alternative embodiment, the unit indicates the other party by voicing a name for verification purpose. The alternative embodiment selects and stores only the name of the other party in response to an entered voice signal and, in the event of response for verification, combines the name having been stored and response information stored beforehand to produce composite response voice.

U.S. Pat. No. 5,231,670 to Richard S. Goldhor et al. describes a system and method for generating text from a voice input that divides the processing of each speech event into a dictation event and a text event. Each dictation event handles the processing of data relating to the input into the system, and each text event deals with the generation of text from the inputted voice signals. In order to easily distinguish the dictation events from each other and text events from each other the system and method creates a data structure for storing certain information relating to each individual event. Such data structures enable the system and method to process both simple spoken words as well as spoken commands and to provide the necessary text generation in response to the spoken words or to execute an appropriate function in response to a command. Speech recognition includes the ability to distinguish between dictation text and commands.

U.S. Pat. No. 5,239,586 to Kuniyoshi Marui describes a voice recognition system which comprises a handset and a hands-free microphone for generating an input audio signal, a high-pass filter for eliminating low frequency components from the signal from the handset or hands-free microphone, a signal lever controller for adjusting the level of the high-pass signal in response to the user of either the handset or hands-free microphone, a storer for storing the speech data and a controller for controlling the storer so that a user's utterance is stored or the user's utterance is recognized by comparing the utterance to speech data already stored. The handset hook switch provides an on-hook control signal to reduce amplifier gain during hands-free microphone operation.

U.S. Pat. No. 5,301,227 to Shoichi Kamei et al. describes an automatic dial telephone that is useable in a motor vehicle, when a voice input is provided during a period in which input of the names of called parties is awaited, a voice pattern of the name of the called party is compared with reference patterns of called parties stored in reference patterns storing device, to determine the degree of the similarity therebetween. The names of the called parties are output to a user in the order of decreasing degree of similarity. Each time the name of a called party is output, a command word for confirmation is a waited from a user for a predetermined time period. When a voice confirmation command is input and is recognized during this waiting period, a telephone number corresponding to the name of the called party is supplied to a channel. Consequently, the command word for confirmation may be input only if the name of the called party outputted is one desired by the user. Sensors continually monitor the driving condition of the motor vehicle in which the telephone is installed. When the operation of the steering wheel or brakes of the motor vehicle exceeds a predetermined threshold or the speed of the motor vehicle is excessive, the sensors generate safety signals that inhibit the operation of the telephone.

U.S. Pat. No. 5,335,276 to E. Earle Thompson et al. describes a communication system which is provided with multiple purpose personal communication devices. Each communication device includes a touch-sensitive visual display to communicate text and graphic information to and from the user and for operating the communication device. Voice activation and voice control capabilities are included within communication devices to perform the same functions as the touch-sensitive visual display. The communication device includes a built-in modem, audio input and output, telephone jacks and wireless communication. A plurality of application modules are used with personal communication devices to perform a wide variety of communication functions such as information retrievable, on-line data base services, electronic and voice mail. Communication devices and application modules cooperate to allow integrating multiple functions such as real time communication, information storage and processing, specialized information services, and remote control of other equipment into an intuitively user friendly apparatus. The system includes both desktop and hand-held communication devices with the same full range of communication capabilities provided in each type of communication device.

U.S. Pat. No. 5,349,636 to Roberto Irribarren describes a communication system for verbal telephonic communication which has a voice message system for storing and retrieving voice messages integrated with a computer database accessing system for storing and retrieving text messages from a separate computer system and for converting the text messages into voice. The systems are integrated via a network which coordinates the functions of each individual system. Additionally, the input/output ports of the voice message system and the computer database accessing system are connected in a parallel fashion to at least one telephone line. In this configuration a user may access both voice messages and database information, including text or electronic mail messages, with a single telephone call. Optionally, facsimile messages can be stored, retrieved and manipulated with a single telephone call.

U.S. Pat. No. 5,406,618 to Stephen B. Knuth et al. describes a telephone answering device that is activated by a proximity sensor when a user crosses its field of detection and whose operation is controlled by simple voice commands. The device incorporates speaker-independent voice recognition circuitry to respond to spoken commands of the user that are elicited by a system generated voice request menu. The telephone answering device performs all the basic functions of a telephone answering machine in response to these simple commands and there is no need for the user to manually operate the telephone answering device.

U.S. Pat. No. 5,602,963 to W. Michael Bissonnette et al. describes a small, portable, hand-held electronic personal organizer which performs voice recognition on words spoken by a user to input data into the organizer and records voice messages from the user. The spoken words and the voice messages are input via a microphone. The voice messages are compressed before being converted into digital signals for storage. The stored digital voice messages are reconverted into analog signals and then expanded for reproduction using a speaker. The organizer is capable of a number of different functions, including voice training, memo record, reminder, manual reminder, timer setting, message review, waiting message, calendar, phone group select, number retrieval, add phone number, security and "no" logic. During such various functions, data is principally entered by voice and occasionally through use of a limited keypad, and voice recordings are made and played back as appropriate. A visual display provides feedback to the user. During the various function, the user can edit various different data within the organizer by eliminating or correcting such data or entering new data.

U.S. Pat. No. 5,621,658 to Brion K. Jackson describes an action contained within an electronic mail object which is communicated from a data processing system to another data processing system via an audio device. The action is executable on a data processing system. At the sending data processing system, the action is converted to a predetermined audio pattern. The electronic mail object may contain text in addition to an action. The text is also converted to an audio pattern. The audio patterns are then communicated to the audio device over telephone lines or other communication medium. At the receiving end, the audio device records the object. A user can provide the recorded object to a data processing system, which then executes the action and converts the text audio patterns back to text. In addition, the action can be converted to text and displayed on the data processing system.

U.S. Pat. No. 5,631,745 to John J. Wong et al. describes a telephone terminal adapted for business or home use that includes the ability to receive and send facsimiles, a voice answering function and a computer modem. Various input and output devices may be used for the facsimile function. A voice annotated facsimile may be sent and received. At the same time the facsimile is viewed on a video monitor or ordinary television set, an accompanying voice message is heard through the sound system of the monitor or television set. The terminal has an architecture including a central processor and an internal bus structure to which several types of memory, various input-output devices and an interface with the telephone line are connected, among others. Audio Random Access Memory (ARAM) is used for storing both facsimile data and voice data.

U.S. Pat. No. 5,671,328 to Gregory P. Fitzpatrick et al. describes a method and data processing system which are disclosed for automatically creating voice processing template entries. In one embodiment, the invention automatically assembles a plurality of commands received by the data processing system, at least one of said commands having a voice recognition criteria component associated therewith, counts the occurrences of the plurality of commands, assembles voice recognition criteria components associated with the plurality of commands, and, as a result of the occurrence count exceeding a predefined minimum, constructs a voice recognition template entry by associating the assembled voice recognition criteria components with the assembled plurality of commands.

U.S. Pat. No. 5,850,627 to Joel M. Gould et al. describes a word recognition system which can: respond to the input of a character string from a user by limiting the words it will recognize to words having a related, but not necessarily the same, string; score signals generated after a user has been prompted to generate a given word against words other than the prompted word to determine if the signal should be used to train the prompted word; vary the number of signals a user is prompted to generate to train a given word as a function of how well the training signals score against each other or prior models for the prompted word; create a new acoustic model of a phrase by concatenating prior acoustic models of the words in the phrase; obtain information from another program running on the same computer, such as its commands or the context of text being entered into it, and use that information to vary which words it can recognize; determine which program unit, such as an application program or dialog box, currently has input focus on its computer and create a vocabulary state associated with that program unit into which vocabulary words which will be made active when that program group has the focus can be put; detect the available computational resources and alter the instructions it executes in response; test if its ability to respond to voice input has been shut off without user confirmation, and, if so, turn that ability back on and prompt the user to confirm if that ability is to be turned off; store both a first and a second set of models for individual vocabulary words and enable a user to selectively cause the recognizer to disregard the second set of models for a selected word; and/or score a signal representing a given word against models for that word from different word model sets to select which model should be used for future recognition.

Notwithstanding the prior art, the present invention is neither taught nor rendered obvious thereby.

SUMMARY OF THE INVENTION

The present invention is a speech enabled automatic name dialer dialing system for connection to a telephone system, utilizing a user computer having a computer-based address book program or equivalent name-telephone number data base for retrieval of name-telephone number data therefrom and for creation therefrom of speech enabling phoneme sets for auto dialing by speaking a name, and utilizing telephone application programming interface, for use with a telephone systems having telephones with private branch exchanges.

In the present invention system, there is at least one user computer having a microphone and a speaker; a telephone application programming interface provider installed in the user computer; and at least one loaded address book program or equivalent name-telephone number data base contained in the user computer. The user computer contains memory for storing the loaded address book program or equivalent name-telephone number data base management, supporting software and the name-telephone number data itself.

The software contained within the user computer, has at least the following functional capabilities:

(i.) accessing the loaded address book program(s) or equivalent data base management for collecting sets of name-telephone numbers based on name inputs;

(ii.) creating converted phonemes from names of name-telephone number data sets;

(iii.) receiving voice inputs from a microphone connected to the user computer;

(iv.) matching the phonemes and the voice inputs to retrieve specific name-telephone number data from the data for initiating an automatic dialing thereof; and, (v.) signaling to a router and to a private branch exchange to initiate a dialing of a telephone number and to effect a telephone call within a telephone system in response to a voice input/phoneme match to a telephone or equivalent phone call-receiving mechanism.

Thus, the user computer is connected to an internal router (Local Area Network, Wide Area Network or similar internal net) for telephone call connection to a private branch exchange for dialing through a telephone to a telephone system to automatically make a call to another telephone or other call-receiving mechanism.

In some embodiments of the present invention system, the user computer software further includes the following functional capability:

(vi.) to prompt a user to take a predescribed action if a voice inputted name does not match available name-telephone number data; and/or (vii.) to prompt a user to speak a phone number when a voice inputted name does not match available name-telephone number data; and, (viii.) to convert voice inputted telephone numbers into signals for automatic dialing.

In some other embodiments of the present invention system, the user computer software may also include the following functional capability:

(ix.) to prompt a user to input name-telephone number data to that user's computer address book program or data base; and, (x.) to return to automatic dialing of the user requested name after the user has inputted the name-telephone number data.

In some other embodiments of the present invention system, the user computer software may also include the following functional capability:

(vi.) to prompt a user to make a selection for a voice inputted name-telephone number match wherein that name contains more than one telephone. For example, the selection may be prompted by audible choices to be voice inputted by a user, with the audible choices selected from the group consisting of home phone number, office phone number, fax number, cell number, pager number, answering service number, and combinations thereof.

In one preferred embodiment of the present invention, the dialing system software includes the following sequence of use:

(1.) user starts-up dialer program;

(2.) speech engine start-up;

(3.) user speaks activation keyword;

(4.) program queries user for contact name;

(5.) if contact name found, if only one number, effects automatic dialing;

(6.) if contact name found with more than one number, prompts selection and, after selection is made, effects automatic dialing;

(7.) if contact name not found, dialer does not dial and awaits further input, if number found, effects automatic dialing, if not, defaults caller.

In some preferred embodiments, the following is added to the sequence of use:

(8.) if contact name is not found, prompts user to create new entry of name-telephone number data. The new entry may be created by manual input through a keyboard, created by voice input or otherwise created by any available input means.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
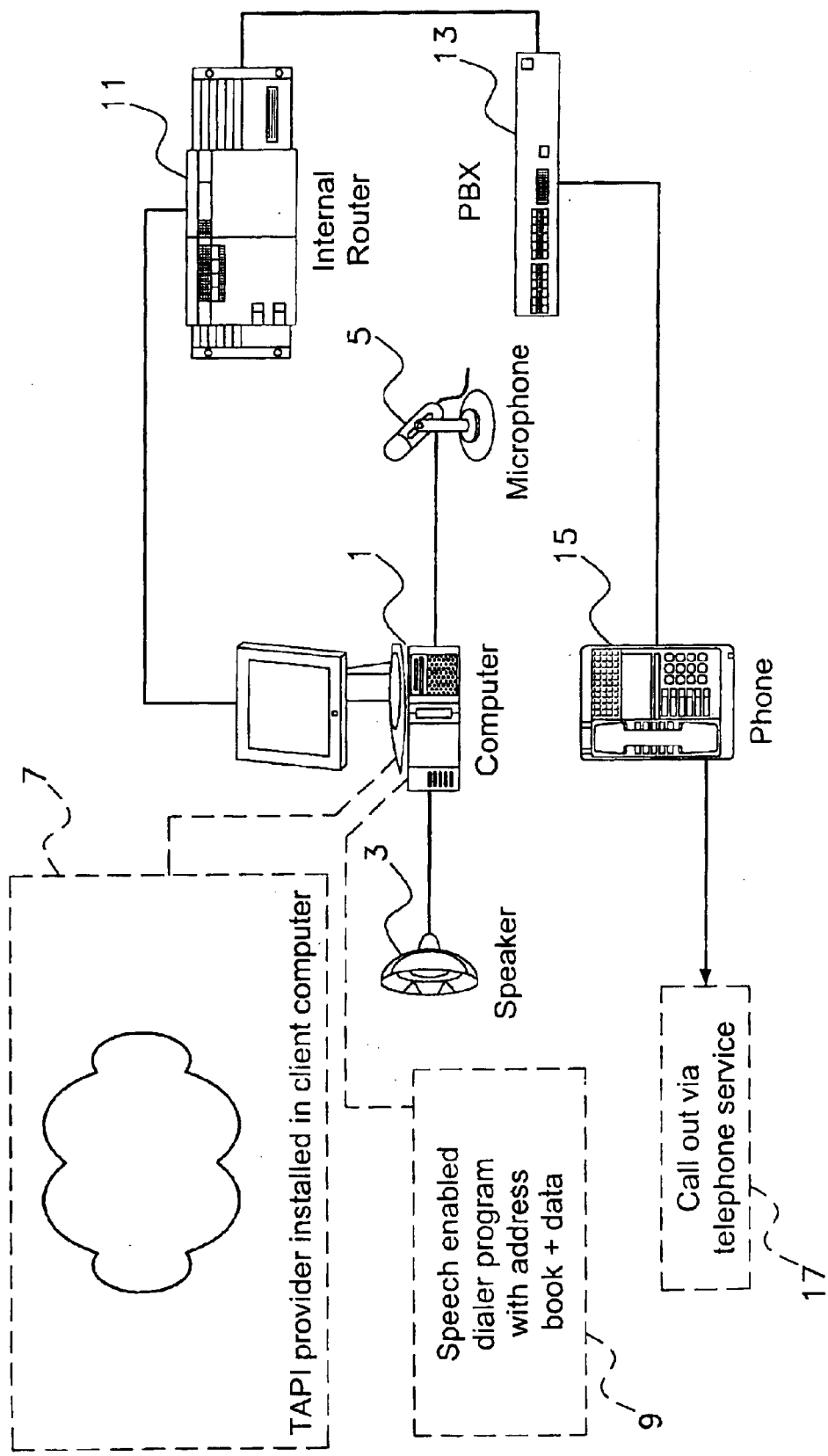
FIG. 1 illustrates a schematic layout of one embodiment of the present invention automatic dialing system.

The present invention is directed to a speech enabled, computer-based automatic dialing system utilizing Telephone Application Programming Interface (TAPI) provider capabilities within the user computer. TAPI is the well-known acronym for telephone application programming interface systems, and especially the broadly used and accepted Microsoft system, also called Microsoft/Intel Telephony API. The present invention includes the Microsoft system as well as any equivalent thereof. Since Microsoft has its own TAPI and is the creator and purveyor of Windows type operating systems, the Microsoft TAPI generally refers to that which is also known as Windows Telephony API. TAPI is a changing (i.e. improving) set of functions supported by Windows that allow Windows applications (Windows 3.xx, 95, 98, NT, millennium, XP, etc.) to program telephone-line-based devices such as single and multi-line phones (both digital and analog), modems and fax machines in a device-independent manner. TAPI essentially does to telephony devices what Windows printer system did to printers—make them easy to install and allow many application programs to work with many telephone devices, irrespective of who made the devices. TAPI is one of numerous high-level device interfaces that Windows offers as part of the Windows Open Services Architecture (WOSA). The details are not elaborated upon herein because TAPI is an industry standard well known in the industry and within the purview of one of ordinary skill in the art of computer-based telephony. TAPI simplifies the process of writing a telephony application that works with a wide variety of modems and other devices supported by TAPI drivers and is one of the critical spects of the present invention.

Another critical feature of the present invention system is the dialer program. This may be a single program or two or more programs linked together. The dialer program is one which responds to voice inputs. It creates phonemes from names contained within the program or provided to the program that correspond to name/telephone number data sets, compares voice inputs to these phonemes and then, when a match is found, either isolates information further to a single phone number, or where only one phone number is in the name number set, proceeds to dial automatically. The dialer may be a single program to perform all of the above, or equivalently, may be linked to one or more separate address book programs in or accessible by the user computer, or it may be linked to a separate data base of name-telephone number sets (not a true address book because only names and numbers would be included, no addresses) within the user computer or accessible thereby.

In the present invention, the dialer program or application is installed on a client machine, i.e. on a user computer. The user computer also has a TAPI provider program installed and configured on it. The user computer is connected to a LAN, WAN or other internal network router to a TAPI compliant PBX which is connected to a telephone to complete the autodialing into a telephone system to complete a call to third party telephone or other call-receiving device.

The user computer has a sound card installed with a microphone and speaker. The user also has one or more telephones that are connected to the previously mentioned PBX and telephony devices similar to telephones in function may be used.

In FIG. 1, there is a schematic layout of one embodiment of the present invention automatic dialing system. User computer 1 (aka client computer) includes a TAPI provider installed 7 and a speech enabled dialer program 9, as well as speaker 3 and microphone 5. Computer 1 is connected to internal network router 11, which may be a LAN or other internal router, as discussed above. Internal router 11 is connected to a PBX 13, which itself is connected to one or more telephones or equivalent telephone-type devices. This arrangement is used to make a telephone call by simply stating to the computer, the name of the person or company you wish to call.

Figure 2:
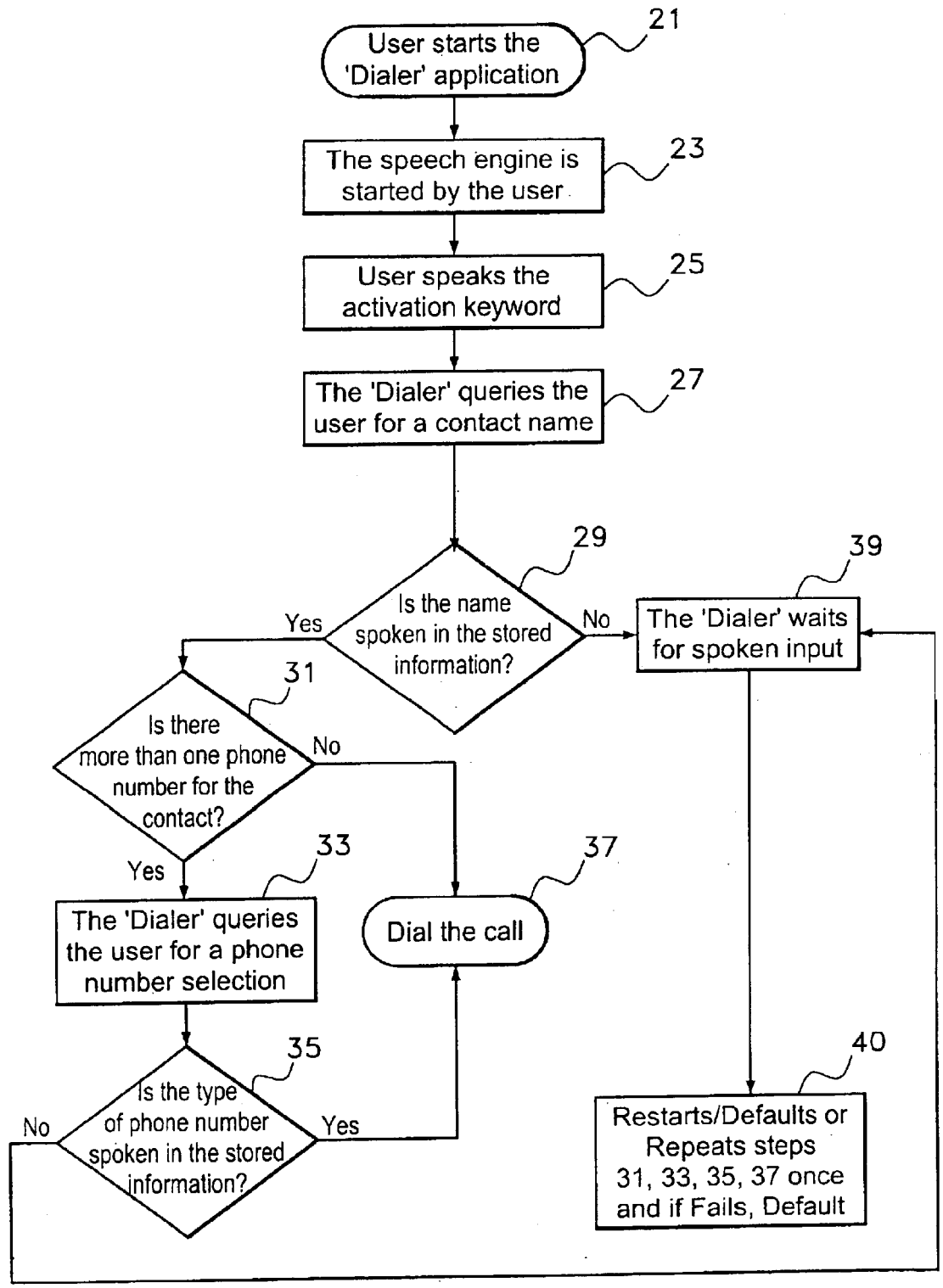
FIG. 2 shows a block diagram of one embodiment of the present invention auto dialing system; and, FIG. 3 shows another block diagram of another preferred embodiment of the present invention auto dialing system.

FIG. 2 shows a block diagram of one preferred embodiment of the present invention auto dialing system which may be embodied by the arrangement shown in FIG. 1. In this embodiment, the sequence is as follows:

A user starts the Dialer application 21, for example, by selecting the program from the programs in the start box or by clicking a shortcut icon. The speech engine is started by the user 23, e.g. by the user starting the dialer or by actively selecting an additional icon or program. The user then says the activation keyword 25 and the dialer program queries the user for a contact name 27. Decision point 29 directs the program depending upon whether or not the contact name spoken by the user matches the name-telephone number sets available. If not, then the dialer program awaits further spoken input 39, and if none is forthcoming after a short wait, or if input is received, then the dialer restarts the inquiry, defaults or repeats 40. It may repeat the steps of inquiry one more time and, if unsuccessful, may default, i.e. tell the user that it cannot find a match and to dial directly or seek assistance from another source, e.g. telephone operator or directory service. If there is a recognition (a Match), then the program will determine if there is more than one number for the contact name given 31. If not, then there will be an immediate automatic dialing of the call 37. If there is more than one number for the contact name, the program will ask the user to make a selection 33. The program may be set up such that the user is prompted for the 'home', 'business', or 'mobile' or the program may be set up to offer actual numbers for the user to select one. If the selection is recognized 35, there will now be an immediate automatic dialing of the call 37. If not recognized, then the program will revert to step 39 and proceed as set forth above.

Figure 3:
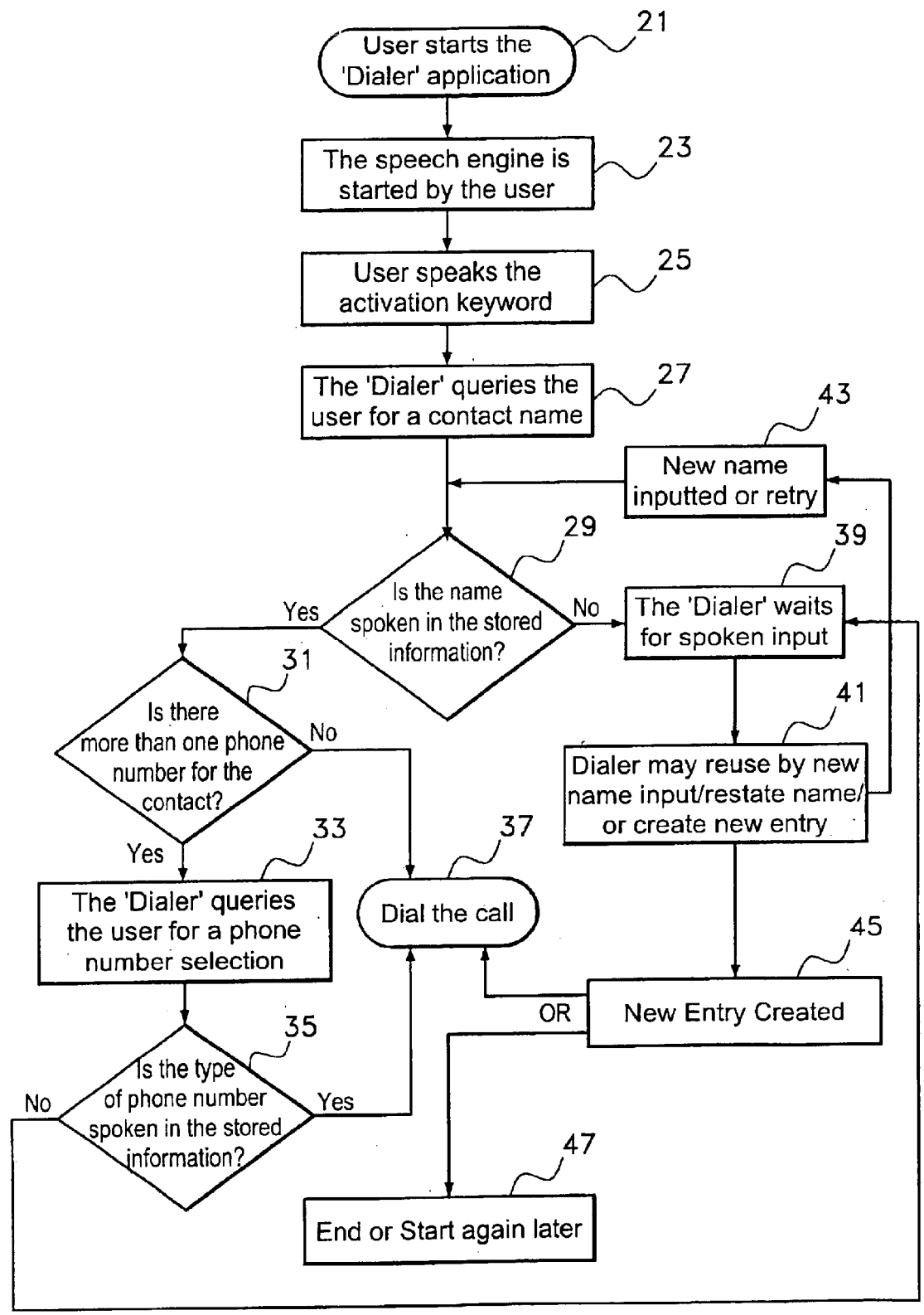

FIG. 3 shows another block diagram of another preferred embodiment of the present invention auto dialing system similar to that shown in FIG. 2 above. All of the sequences and steps identical to that of FIG. 2 above has identical numbering and need not be re-explained here, as those aspects function identically. In this FIG. 3 embodiment, what happens after step 39 differs from the FIG. 2 approach. Here, the dialer may reuse the program from this point by stating a new name, by restating the old name or by directing the system to create a new name-telephone number set for the data base 41. The new is inputted or the old name is stated for a retry 43. This reverts the program back to step 29 and proceeds accordingly as shown. If a new entry is created 45, the user may be asked to select end 47 or dial the call just entered 37.

Obviously, numerous modifications and variations of the present invention are possible in light of the above teachings. It is therefore understood that within the scope of the appended claims, the invention may be practiced otherwise than as specifically described herein.

What is claimed is:

1. A speech enabled automatic name dialer dialing system for connection to a telephone system, utilizing a user computer having a computer-based address book program for retrieval of name-telephone number data therefrom and for creation therefrom of speech enabling phoneme sets for auto dialing by speaking a name utilizing telephone application programming interface, for use with telephones with private branch exchanges, which consists of:
   (a) at least one user computer having a microphone and a speaker;
   (b) a telephone application programming interface provider in said user computer;
   (c) memory within said at least one user computer for storing, managing and supporting name-telephone number data;
   (d) software contained within said user computer, having at least the following functional capabilities, to be performed in sequential order:
      (i) accessing said at name-telephone number data contained within said at least one user computer;
      (ii) creating converted phonemes from names of said name-telephone number data;
      (iii) receiving voice inputs from a microphone connected to said user computer;
      (iv) matching said phonemes and said voice inputs to retrieve specific name-telephone number data from said computer-based name-telephone number data for initiating an automatic dialing thereof; and,
      (v) signaling to a router and to a private branch exchange to initiate a dialing of a telephone number and to effect a telephone call within a telephone system in response to a voice input/phoneme match; and, wherein said software further includes the following functional capability to be performed in sequential order:
      (vi) to prompt a user to speak a phone number when a voice inputted name does not match available name-telephone number data; and,
      (vii) to convert voice inputted telephone numbers into signals for automatic dialing.

2. The dialing system of claim 1 wherein said software further includes the following functional capability:
   (viii.) to prompt a user to input name-telephone number data to that computer's name-telephone number data; and,
   (ix.) to return to automatic dialing of the user requested name after the user has inputted said name-telephone number data.

3. The dialing system of claim 1 wherein said software further includes the following software capability:
   (viii.) to prompt a user to make a selection for a telephone number for a voice inputted name-telephone number match when that name contains more than one telephone number wherein said selection is prompted by audible choices to be voice inputted by a user, said audible choices selected from the group consisting of home, office, fax, cell, answering service, and combinations thereof.

4. The dialing system of claim 1 wherein said at least one user computer is connected to said router, said router is connected to a telephone application programming interface compliant private branch exchange.

5. The dialing system of claim 1 wherein said software includes the following sequence of use:
   (1.) user starts-up dialer program;
   (2.) speech engine start-up;
   (3.) user speaks activation keyword;
   (4.) program queries user for contact name;
   (5.) if contact name found, if only one number, effects automatic dialing;
   (6.) if contact name found with more than one number, prompts selection and, after selection is made, effects automatic dialing;
   (7.) if contact name not found, dialer does not dial and awaits further input, if number found, effects automatic dialing, if not, defaults caller.

6. The dialing system of claim 5 wherein the sequences of use also includes:
   8.) if contact name is not found, prompts user to create new entry of name-telephone number data.

7. The dialing system of claim 6 wherein said new entry is created by a manual input through a keyboard.

8. The dialing system of claim 6 wherein said new entry is created by voice input.

9. A speech enabled automatic name dialer dialing system for connection to a telephone system, utilizing a user computer having a computer-based address book program for retrieval of name-telephone number data therefrom and for creation therefrom of speech enabling phoneme sets for auto dialing by speaking a name utilizing telephone application programming interface, for use with telephones with private branch exchanges for automatic dialing into a telephone system, which compromises:
   (a.) at least one user computer having a microphone and a speaker;
   (b.) a telephone application programming interface provider installed in said user computer;

(c.) at least one loaded address book program contained in said at least one user computer;
(d.) an internal network router connected to said at least one user computer for telephone call transmittal via a private branch exchange for dialing through a telephone into a telephone system;
(e.) memory within said at least one user computer for storing said at least one loaded address book program, supporting software and name-telephone number data;
(f.) software contained within said user computer, having at least the following functional capabilities:
  (i) accessing said at least one loaded address book program contained within said at least one user computer;
  (ii) creating converted phonemes from names of said name-telephone number data;
  (iii) receiving voice inputs from a microphone connected to said user computer;
  (iv) matching said phonemes and said voice inputs to retrieve specific name-telephone number data from said computer-based name-telephone number data for initiating an automatic dialing thereof; and,
  (v) signaling to a router and to a private branch exchange to initiate a dialing of a telephone number and to effect a telephone call within a telephone system in response to a voice input/phoneme match; and,
wherein said software further includes the following functional capability:
  (vi) to prompt a user to speak a phone number when a voice inputted name does not match available name-telephone number data; and,
  (vii) to convert voice inputted telephone numbers into signals for automatic dialing.

10. The dialing system of claim 9 wherein said software further includes the following functional capability:
  (viii.) to prompt a user to input name-telephone number data to that user's computer address book program; and,
  (ix.) to return to automatic dialing of the user requested name after the user has inputted said name-telephone number data.

11. The dialing system of claim 9 wherein said software further includes the following software capability:
  (viii.) to prompt a user to make a selection for a telephone number for a voice inputted name-telephone number match when that name contains more than one telephone number wherein said selection is prompted by audible choices to be voice inputted by a user, said audible choices selected from the group consisting of home, office, fax, cell, answering service, and combinations thereof.

12. The dialing system of claim 9 wherein said at least one user computer is connected to said router, said router is connected to a telephone application programming interface compliant private branch exchange.

13. The dialing system of claim 9 wherein said software includes the following sequence of use:
  (1.) user starts-up dialer program;
  (2.) speech engine start-up;
  (3.) user speaks activation keyword;
  (4.) program queries user for contact name;
  (5.) if contact name found, if only one number, effects automatic dialing;
  (6.) if contact name found with more than one number, prompts selection and, after selection is made, effects automatic dialing;
  (7.) if contact name not found, dialer does not dial and awaits further input, if number found, effects automatic dialing, if not, defaults caller.

14. The dialing system of claim 13 wherein the sequences of use also includes:
  8.) if contact name is not found, prompts user to create new entry of name-telephone number data.

15. The dialing system of claim 14 wherein said new entry is created by a manual input through a keyboard.

16. The dialing system of claim 14 wherein said new entry is created by voice input.

* * * * *